(12) United States Patent
Hartman et al.

(10) Patent No.: US 7,526,100 B1
(45) Date of Patent: Apr. 28, 2009

(54) SYSTEM FOR PROCESSING AND RECOGNIZING OBJECTS IN IMAGES

(75) Inventors: Richard L. Hartman, Huntsville, AL (US); Keith B. Farr, Madison, AL (US)

(73) Assignee: Advanced Optical Systems, Inc., Huntsville, AL (US)

( * ) Notice: Subject to any disclaimer, the term of this patent is extended or adjusted under 35 U.S.C. 154(b) by 635 days.

(21) Appl. No.: 10/831,587

(22) Filed: Apr. 22, 2004

Related U.S. Application Data

(60) Provisional application No. 60/464,479, filed on Apr. 22, 2003.

(51) Int. Cl.
*G06K 9/00* (2006.01)
(52) U.S. Cl. .......................... 382/103; 382/112
(58) Field of Classification Search ................ 382/211, 382/31, 278; 708/816; 359/298, 559; 250/550
See application file for complete search history.

(56) References Cited

U.S. PATENT DOCUMENTS

| | | | | |
|---|---|---|---|---|
| 3,666,359 A | * | 5/1972 | Lee | 359/29 |
| 4,198,125 A | * | 4/1980 | Tatian et al. | 359/561 |
| 4,695,973 A | * | 9/1987 | Yu | 708/816 |
| 4,826,285 A | * | 5/1989 | Horner | 359/561 |
| 5,148,316 A | * | 9/1992 | Horner et al. | 359/561 |
| 5,151,822 A | * | 9/1992 | Hekker et al. | 359/559 |
| 5,175,775 A | * | 12/1992 | Iwaki et al. | 382/211 |
| 5,185,815 A | * | 2/1993 | Brandstetter | 382/211 |
| 5,323,472 A | * | 6/1994 | Falk | 382/103 |
| 5,327,370 A | * | 7/1994 | Brandstetter et al. | 708/816 |
| 5,418,380 A | * | 5/1995 | Simon et al. | 250/550 |
| 5,528,702 A | * | 6/1996 | Mitsuoka et al. | 382/211 |
| 5,659,637 A | * | 8/1997 | Bagley et al. | 382/278 |
| 5,737,420 A | * | 4/1998 | Tomko et al. | 380/285 |
| 6,005,985 A | * | 12/1999 | Brison et al. | 382/278 |
| 6,080,994 A | * | 6/2000 | Carrott et al. | 250/550 |
| 7,068,844 B1 | * | 6/2006 | Javidi et al. | 382/218 |

OTHER PUBLICATIONS

Optical information processing and Beyond, Yoshiki Ichioka et al. May 1996, IEEE 0018-92199603750-4, vol. 84 pp. 694-719.*

* cited by examiner

*Primary Examiner*—Jingge Wu
*Assistant Examiner*—Jayesh A Patel
(74) *Attorney, Agent, or Firm*—Mark Clodfelter

(57) ABSTRACT

A system for recognizing objects in images, and using that recognition to solve mission problems, such as identifying, tracking, and reporting movement of mobile military targets of interest. The system incorporates preprocessor and postprocessor with an image correlator, control systems, and feedback loops functioning with a real-time operating system. Tracking includes correlating patterns in an image stream so as to monitor image changes that represent changes of location, shape, trends, or other attributes. Reporting may entail visual displays of correlation results, or other data outputs suitable for steering gimbaled sensors, aiming weapons, or for other functions. The instant invention has application in numerous areas where recognition and tracking of patterns and trends are desired in imagery or in other two-dimensional representations of data.

17 Claims, 8 Drawing Sheets

SYSTEM FOR PROCESSING AND RECOGNIZING OBJECTS IN IMAGES

CROSS-REFERENCE TO RELATED APPLICATIONS

This application claims the benefit of Provisional application Ser. No. 60/464,479, filed Apr. 22, 2003.

STATEMENT REGARDING FEDERALLY SPONSORED R&D

The US government has limited rights under the provisions of FAR 52.227-11 as contained in Contract #N00178-99-C-3018.

FIELD OF THE INVENTION

This invention relates generally to a system employing an optical correlator and particularly to such a system wherein components associated with a correlator provide a capability for automatically identifying, tracking, and reporting patterns in two-dimensional images of scenes from imaging sensors, or other two-dimensional presentations of data, which patterns may represent physical objects or particular features of data when imaged in two dimensions.

BACKGROUND OF THE INVENTION

Individual image processing techniques are prolific, as taught in "Numerical Recipes in C," and as available in software packages such as Photoshop™. Some image processors make use of correlators that compare a reference image to a scene to find a reference object in the scene. Some correlators are discussed in "Optical Processing" by A. VanderLugt.

There is prior art on the theory of correlators, on the design of the optical processor assembly of optical correlators, and especially on the theory of designing the reference image filters of the correlator. There is little prior art on practical applications of correlators, and there is little art on the integration of correlators and supporting image processing techniques along with other components, processes, and methods to provide practical solutions for real-world problems, especially those applications that require real-time object or pattern recognition or tracking. A typical scientific paper on a correlator describes a spot of light, or a three-dimensional plot of the spot, and does not solve any real problem. The large literature on reference filter design addresses optimization of a variety of internal correlator functions, such as light efficiency, but fails to address any optimization in terms of the application of the correlator.

Anthony VanderLugt teaches the operation of a correlator. He also teaches the potential of post-processing of the correlation plane. J. Horner teaches the combination of one specific preprocessor and a correlator. None of these sources combine pre-processing, correlation, and post processing, and none describe how to integrate all these functions with other functions necessary to provide a practical, real-time capability for pattern recognition, tracking of objects and trends, and outputs for control of external resources such as camera gimbals.

Many practical applications of an image recognition capability require a continuous tracking of the location of the recognition, for example, in a missile seeker tracking a target aircraft. The prior art does not disclose a combination of pre-processor, correlator, and post-processor in conjunction with a location tracker. In many applications, the correlation filter must vary with the circumstances of the application. For example, in a missile engagement, an image of a target grows as the missile gets closer to the target, and may also change due to changes in aspect as the target, or missile, maneuvers. Prior art fails to disclose techniques for efficiently modifying correlation filters, or selecting alternate filters, to provide for correlation with the image of a target as it changes in aspect angle, scale, or both.

In prior art descriptions, there is little discussion of means of controlling and synchronizing all operations of various processing components of a system. For example, use of a Windows™ operating system is insufficient for many practical missions as Windows™ does not provide deterministic timing and synchronization necessary for real-time operation of recognition and tracking systems employing correlators.

DETAILED DESCRIPTION OF THE DRAWINGS

Figure 1:
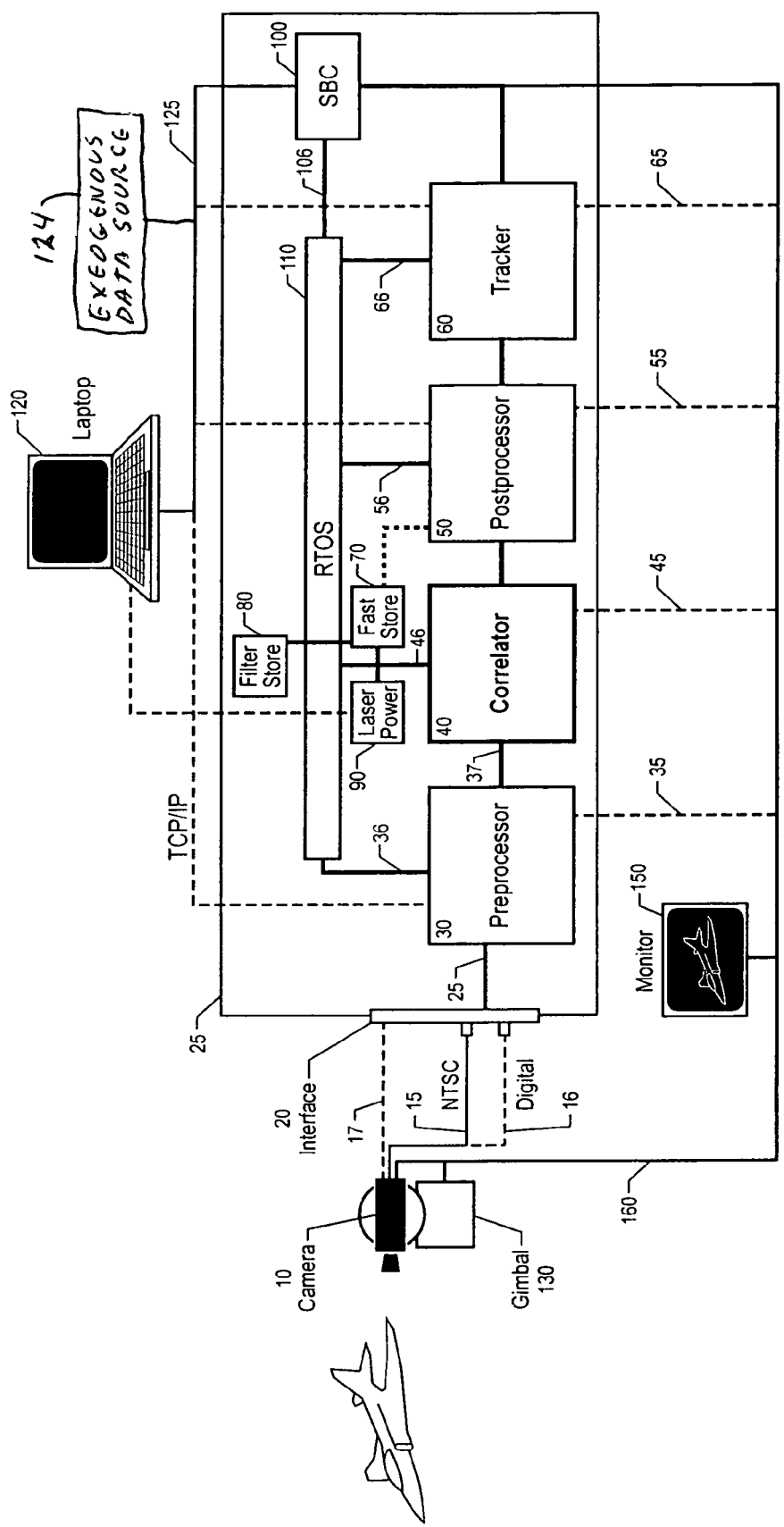
FIG. 1 is a partially schematic, partially block, diagram of the key components of a representative embodiment of the instant invention.

FIG. 1 provides a partially schematic, partially block, diagram overview of one embodiment of the instant invention. Key components of the embodiment illustrated in FIG. 1 include image source 10, such as a video camera, which forms an image. An interface 20 provides for connection of an analog 15 or digital 16 image data stream 15, 16 to a processor unit 25, and also provides for various control signals 17 as needed between an image source 10 and a processor unit 25. A preprocessor 30, which may include an image digitizer if necessary in a particular embodiment (an image digitizer may be included in an interface 20 in some other embodiments), and which may include processors such as Field Programmable Gate Arrays (FPGAs), receives an image data stream and applies algorithms to pre-condition image data. Image processing algorithms such as an unsharp mask algorithm, as will be described, may be embedded in said processors such as FPGAs.

Some specific applications of applicants invention include, but are not limited to, automated target recognition, identification, and aim-point selection by smart weapons, parts inspection, analysis of medical imagery, detection of counterfeit currency, machine vision, automated analysis and geo-registration of imagery, and food grading and quality control.

An output of preprocessor 30 is connected to a correlator 40, which may include a digital, optical, or hybrid unit performing a correlation function. An output of correlator 40 is attached to an input of a post-processor 50 which may contain FPGAs, central processing units (CPUs), and ancillary circuits to support post-processing functions. In one embodiment, a postprocessor utilizes a unique, adaptive, spatially variant, constant false alarm rate threshold algorithm.

An output of a post-processor 50 is attached to a tracker 60. If tracking is not required in a particular embodiment, a tracking functional capability may be omitted. In one embodiment, a tracker 60 uses predictive filtering, such as Kalman filtering, and tracks location, aspect, and scale of an object. Such filtering is well known art.

A high speed filter store 70, coupled to correlator 40, is connected to a larger store of filters 80. These filters form a library of complex conjugates of Fourier transforms of respective reference images related to an object of interest which may be imaged by camera 10. A laser power controller 90 is associated with filter store 70.

All aforementioned components are connected, e.g., via backplane data buses 36, 46, 56, 66, 106, to a control computer 100, which may be a single board computer (SBC) in some embodiments, through a Real Time Operating System (RTOS) 110. Control computer 100 is connected to an operation computer 120 such as a laptop through a data bus 125 which may be an Ethernet network in some embodiments.

An output signal 55, 65 of a post-processor 50 and/or tracker 60 is connected back to a preprocessor 30, correlator 40, postprocessor 50, and filter store system 70 and 80, through a RTOS 110. Output signals 55, 65 may also be connected through a data link 160 to a mechanical pointing system such as a gimbal 130. Various outputs 35, 45, 55, 65 may also be connected to display monitors 150. Control information may flow through a data bus 160 to control operations of an image source 10.

Figure 2:
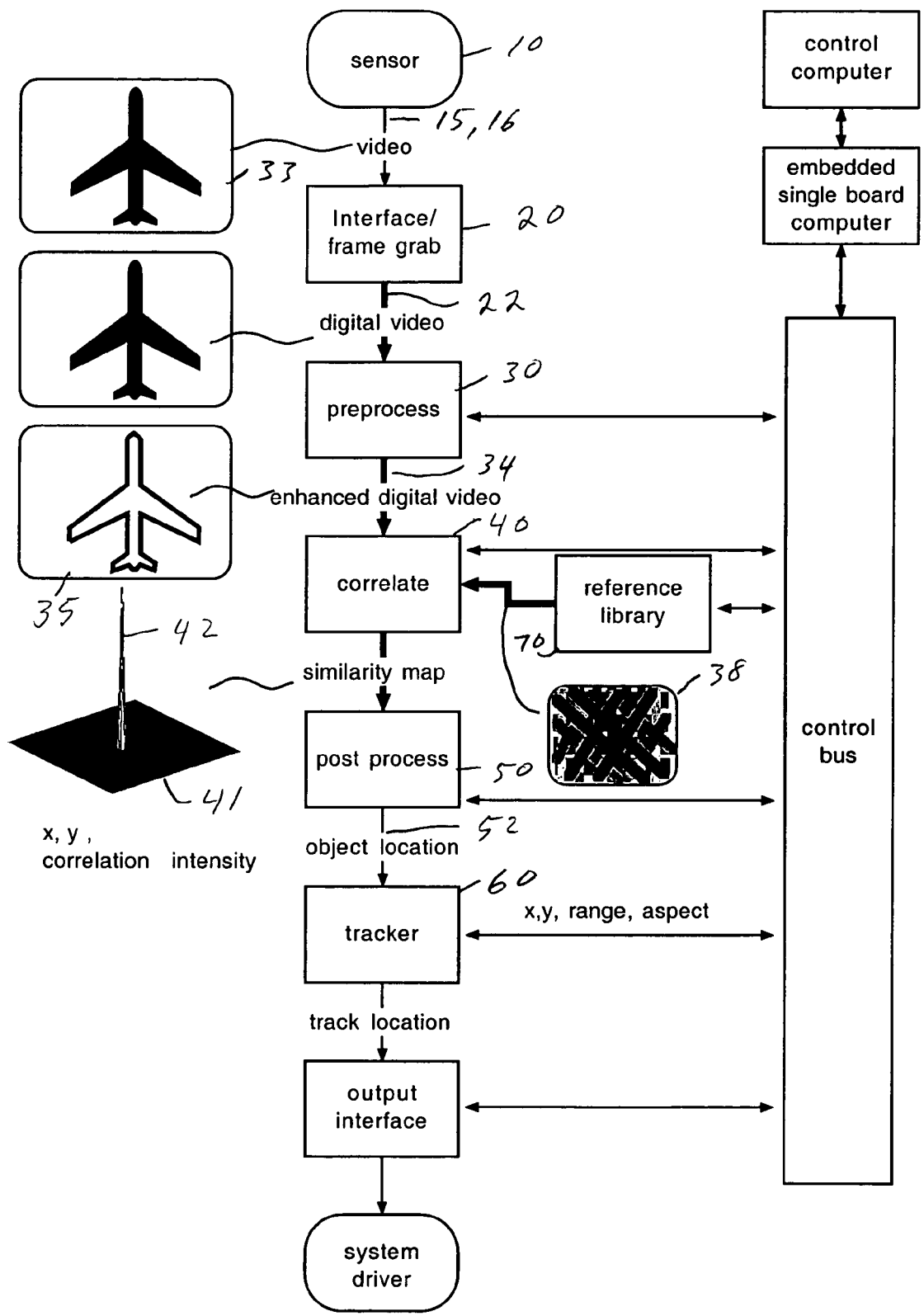
FIG. 2 is a flow diagram showing a representative flow of information among components of a representative embodiment of the instant invention.

FIG. 2 illustrates a typical flow of information among components in a representative embodiment of the instant invention. The image data 15, 16 to be processed, such as the image 33 containing a jet aircraft, originates in an image source 10 that may be an imaging sensor, for example a video camera providing NTSC or streaming digital video, but can also be any generator of two-dimensional data.

Image data 15, 16 from the image source 10 flows through a cable appropriate for the image data format, for example a coaxial cable in the case of NTSC video 15, to an interface 20.

Interface 20 captures image data 15, 16 and if necessary converts it to digital form, for example in a frame grabber.

Input interfaces 20 are available from a variety of sources. For example, if the image source 10 output is digital Firewire™ video 16, an iMAC™ computer using iPHOTO™ or iMOVIE™ software is capable of interface 20 functions. For analog video 15, for example NTSC standard video, Video frame grabbers implemented as on-board modules, standalone boards, or external boxes are available from a variety of sources, including National Instruments. The use of streaming video input is desirable in many embodiments as this format will help minimize the transport delay.

Image data stream 22 then flows through a data bus 25 (FIG. 1) to a preprocessor 30, where it is preprocessed. A typical preprocessor 30 of the instant invention deals with a small portion of an image at a time, for example, a 5 by 5 pixel area. Preprocessing generally modifies image data 22 and may include gamma correction, adjustment of gain and offset, and in some embodiments, application of a local region algorithm. In a typical embodiment, a local region algorithm is an "unsharp mask" algorithm, described in Russ page 26 and 244, and in Gonzalez p 196, as indicated in the appended references. An unsharp mask algorithm provides a local enhancement of high frequencies, such as edges, and generally improves performance of a correlator. Output 34, which may be enhanced digital video, of a preprocessor 30 is adjusted in software or firmware to match values needed by an input of a correlator 40. An important innovation in the instant invention is use of preprocessing algorithms that optimize performance of a correlator 40, e.g., to obtain a best signal-to-noise ratio, rather than providing pleasing images to human observers.

A typical "unsharp mask" algorithm used in some embodiments has been described by Gonzalez. Several other image processing techniques that could be applied in a preprocessor are discussed by Russ. A choice of preprocessing logic and parameters will depend on a particular problem being solved. A stand-alone box that performs a streaming process for implementation of an unsharp mask is sold by DigiVision of San Diego, Calif., as the CE-3000. A form of an unsharp mask algorithm that may be used in some embodiments is $$Y=c(X-\overline{X})+(1-b)\overline{X}(d)+bM$$

where Y is an output image, X is an original image, $\overline{X}(d)$ is a two-dimensional low-pass filtered version of an input image, and M is the mean brightness of the original image. Adjustable parameters are b for brightness, c for contrast, and d for a two-dimensional low-pass frequency cutoff.

An ability to select algorithms and parameters through a central control system, and to adjust parameters as a result of an output of the correlator system and postprocessor 50 (FIG. 1), are novel and unobvious ingredients of the instant invention that are not taught by referenced authors.

Several authors, for example Flannery, have discussed use of a pre-processor with a correlator. Horner has used an edge enhancement algorithm to preprocess images for a binary phase only correlator. In practice, the edge enhancement preprocessing was almost necessary for the binary phase only correlator to work. Disadvantages of Horner's edge enhancement are that it eliminates use of internal target features, works poorly if a target does not have sharp external edges, and makes a system very sensitive to rotation. The preprocessing was not a real time process as taught in the instant invention. Gregory et al used a contrast enhancement algorithm to pre-process images for a correlator. However, this worked only with very high contrast targets to start with, required operator adjustment of a contrast switching point, and caused failure when there was a small change in illumination caused by a cloud passing and blocking the sun. While this preprocessor was real time in that there was a continuous flow of data, the transport delay was very large, as the preprocessing was done a frame at a time rather than with streaming video. None of these authors combined these two elements with a complete system as disclosed herein, nor do they provide adaptive control of parameters. In contrast, we disclose use of a preprocessor 30 and a correlator 40 within an entire system. In particular, a combination of an "unsharp mask" algorithm with a correlator 40 provides greater correlation signal-to-noise ratio, and increased tolerance to light intensity in a scene.

A preprocessed image data stream 34 then flows to a correlator 40 through a data bus 37. At the same time a reference data array 38 flows from a reference filter store 70 to a correlator 40 where the reference data array is used to generate a reference filter image on a liquid crystal display device 320 (FIG. 5) or a similar device within the correlator 40. Generation of a reference data filter is discussed in the next section and also in the literature.

In this example, the correlator 40 performs a Fourier transform of the enhanced digital video, which transform being included in a correlation algorithm and afterwards performs the optical correlation between the transformed image data array 35 (FIG. 2) and a reference filter data array 38. The correlator 40 generates a similarity map 41 between two input data arrays 35, 38. If a reference object represented in the reference filter is located in a sensor image 35, similarity map 41 comprises a spot 42 whose intensity measures the degree to which two input images 35, 38 are similar, and whose location measures the location of the reference object in a sensor image 35. The output of the correlator is therefore another and simpler image.

Correlator 40 compares two images 35, 38, and shows an extent to which they are the same, and if they have a region of similarity, where that region is located. The simplest description, by analogy, of how a typical correlator operates is to slide a negative of one image over a positive of another image. For the most part, an average amount of light will come through. However, where the images are the same, when they slide into alignment, no light can come through, and there is a sharp indication that the compared images are the same. A difficulty with this simple view is that for an n×n pixel image, there are $n^2$ possible sliding relations, $n^2$ multiplications in each relation, and $n^4$ additions.

A mathematically more complex approach is to use two-dimensional Fourier transforms, as taught by VanderLugt. A Correlation similarity map 41 is an inverse transform of a product of a transform of one image with a complex conjugate of a transform of the other image. It has been proven that this provides a maximum signal-to-noise ratio in detection of a signal. It also does not require searching by sliding one image with respect to another.

A Fourier transform is a "global" operation, in that each pixel in an image is involved in a calculation with each other pixel. This is a computationally intensive approach, alleviated only partially by development of a Fast Fourier transform.

However, an optical analog system provides a natural, high speed solution to this algorithm. A quadratic phase shifting lens operating in coherent light, as from a laser, has in its back focal plane a two-dimensional Fourier transform of an image in its front focal plane. Thus to perform a correlation algorithm, an image is illuminated with laser light, followed by a Fourier transforming lens, followed by a transparency (e.g., a filter) which is a complex conjugate of a Fourier transform of a reference image, followed by another Fourier transform lens. At a back focal plane of this last lens is the similarity map.

A Fourier transform based correlation algorithm is thoroughly discussed in VanderLugt.

Correlator 40 (FIGS. 1 and 2) compares a modified input scene 35 to a reference filter 38, stored in a high speed filter store 70. The result is a similarity map 41, showing how much a real time image scene 35 is like a reference 38. With proper selection of preprocessing algorithms and filter design, a correlation similarity map 41 produces a sharp spike 42. Novel features of the instant invention include use of preprocessing 30 and filter designs that optimize mission performance, as compared to designs that optimize only certain internal correlator parameters.

For example, once a correlation spike or peak 42 reaches a sufficient signal-to-noise ratio to be acceptable to a post-processor 50 and/or tracker 60, there is little advantage to continuing to increase signal-to-noise ratio. Instead, margins can be used to increase tolerance to other parameters, such as target configuration, or target rotation, depending on mission requirements.

Since different reference filters have different light efficiencies, it is a novel feature of the instant invention that a filter store 70 may also control a power level of a laser 300 (FIG. 5) used in an optical correlator 40, adjusting it for each filter. For example, during development of each filter, an autocorrelation is done between the filter and its complex conjugate, with an intensity of the laser being varied to develop a best correlation. The laser intensity is assigned a value of from 1 to 256, with 1 being dimmest and 256 being brightest. The intensity number that obtains the best correlation spike is then assigned to that filter. In some embodiments, control of laser power is performed by controlling a pulse width, but in other embodiments, a CW laser having a digitally controlled intensity level may be used as an alternative.

In some embodiments, a correlator 40 can sequentially examine each input frame with several reference filters. The instant invention includes use of multiple filters for a target or other pattern being sought in image data 35, as well as use of multiple filters for a given target to determine range and aspect. One of the novel and unobvious features of the instant invention is use of a feedback loop to aid in a predictive mode selection of a filter to be used in a future comparison based on a different range, aspect, or other situation.

Figure 7:
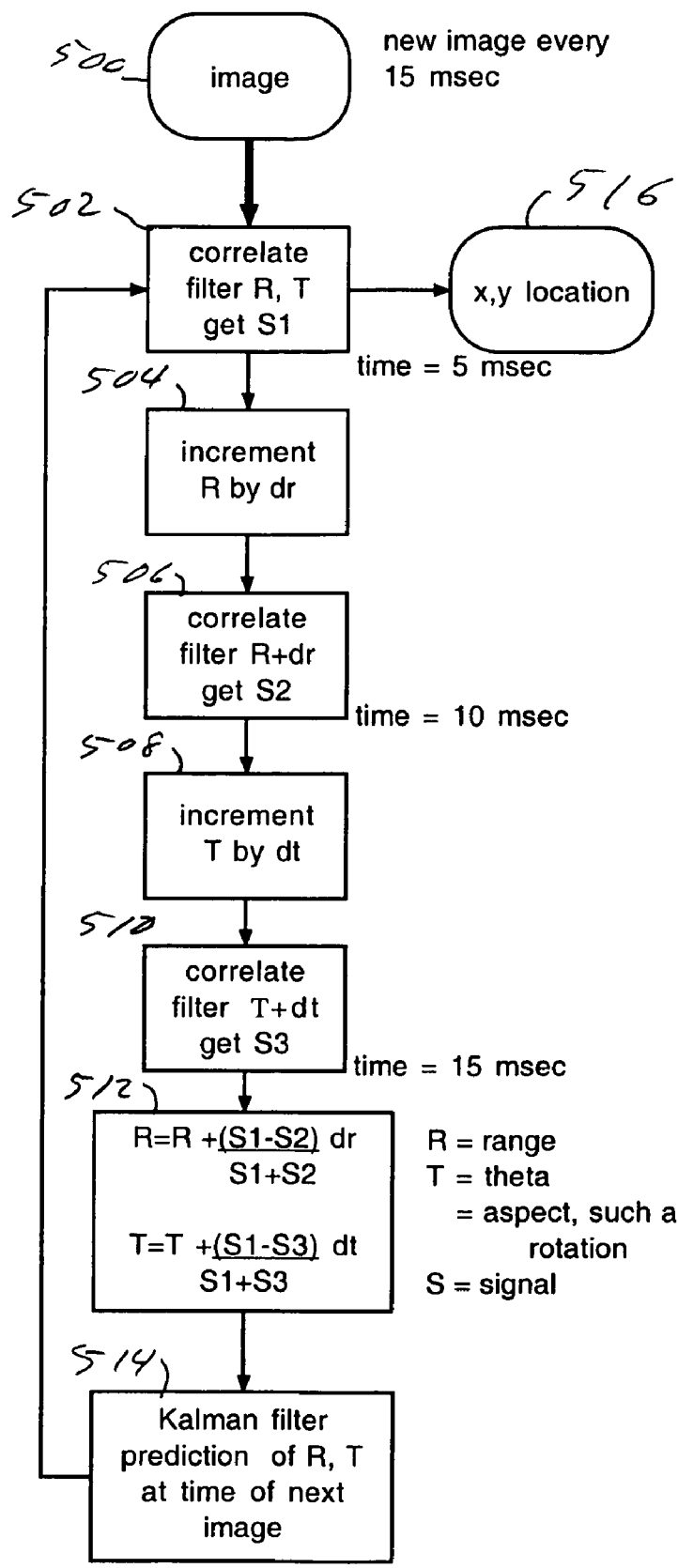
FIG. 7 is a flowchart illustrating a representative implementation of a feedback loop used to support selection of reference filters based on tracked parameters in an embodiment of the instant invention.

For example, referring to FIG. 7, consider a case of looking at five filters during a frame. A first filter may be selected based on exogenous data, such as laser range information or radar profiles. As such, a search through the available filters may be narrowed from, for example, 1000 available to 40 or so simply by knowing range to the target. Once the target is located, an output 33 is provided, for example, to a gimbal system, at a minimum transport delay, critical for closed loop real-time control systems. Then, two additional filters may be used to provide plus and minus excursions on scale, after which two additional filters may be used to provide excursions on aspect. Results from correlations with four filters may thus be used to measure a current scale and aspect, or other attributes of an object or data pattern, to determine a trend and thus be used to aid in selecting filters for future comparisons and tracking. If a tracker 60 is using a predictive algorithm, a filter selection is a best guess to scale and aspect at a time of a future frame [e.g., next frame, or second or third future frame] based on information gained from a current and, in some embodiments, previous frames.

A correlation output image, generally in a form of a similarity map 41, from a correlator 40 then flows to a post-processor 50. A post-processor 50 applies algorithms that help distinguish a correlation peak from clutter in a similarity map. A post-processor 50 typically deals with a small portion of an image at a time, for example, an 8 by 8 pixel area. A post-processor 50 may modify similarity map 41 through application of a local region algorithm, as explained later herein. A Lapacian filter is an alternate. Post-processor 50 determines if a peak 42 in a similarity map 41 is in fact a correlation, and also determines corresponding locations of correlations. One approach to detecting correlations that may be used in some embodiments is a Constant False Alarm Rate (CFAR) algorithm, wherein a noise level of signals in a similarity map 41 is measured, and a threshold is set, typically called a CFAR threshold, that allows noise to exceed the set threshold at a specified rate (typically a low value). Then any signal higher that a set threshold is declared a target. In some embodiments, a CFAR threshold may be both temporally and spatially adaptive. Some embodiments may also employ additional algorithms in a post-processor 50 to perform functions that selectively enhance correlation spikes compared to noise or clutter.

In some embodiments, a post-processor 50 may also use time history of correlation peak strength and location to improve target-detection-to-false-alarm rate. For example, a temporary appearance of a false peak at a far removed new location may imply physically impossible motion. Time history may also be a attribute considered only by tracker 60.

In a typical embodiment, a detection threshold in a post-processor 50 is set such that only one sharp peak in a similarity map 41 exceeds the set threshold if only one reference object is in a scene. A typical post-processor 50 then outputs one or more parameters that indicate the strength of a detected correlation and a corresponding location in an image where a correlation peak was detected.

VanderLugt teaches a special postprocessor that provides adaptive thresholds to detect correlation peaks. However, this also requires a special architecture of the correlator, and the use of a holographic reference filter. His discussion does not place the correlator and post processor into a complete system architecture. Hahn and Bauchert discuss the existence of a post processing algorithm, but do not disclose the algorithm itself. They do not place the correlator and post processing system within a complete system architecture. U.S. Pat. No. 6,005,985 discloses a post processing system. They do not place the post processing system into a complete system architecture. Their algorithm is a way of doing it, but there are a variety of other approaches.

In contrast, applicants provide for the use of a multiplicity of post processing algorithms, and include the post processor in a full system architecture.

In many applications and embodiments, results 52 (FIG. 2) from a post-processor 50 then flow to a tracker 60. In such embodiments, a tracker 60 detects and outputs locations of one or more objects in a scene. In some embodiments, a tracker 60 uses time history of suitable tracking parameters in some reference frame to improve the smoothness and accuracy of a location determination. This can be done with Kalman filtering, exponential smoothing, or similar known techniques.

Since a correlator 40 of the instant invention may be made sensitive in some embodiments to aspect and scale, by selective and adaptive use of filters as described herein, a tracker 60 may also establish track files in some embodiments for aspect and/or scale variables, and use this information in selecting filters to be inserted into a correlator 40 for future correlations. Thus, some embodiments of the instant invention may use a tracker 60 to support predictive selection and use of filters to improve overall performance for certain applications.

As stated, the instant invention also allows for use of exogenous information 124 (FIG. 1) which may be received from sensors or other data sources external to embodiments of the instant invention. For example, if a range to a target is known by other means, that information may be provided through an Ethernet link and inserted into a filter selection algorithm.

The tracker also outputs its information to the external world for mission use. For example, the tracker may generate crosshairs which are overlaid on the original video for use by a human observer. In some embodiments, this is handled by the preprocessor, with information from the tracker.

The output may be used to provide error signals to a pointing device, such as a gimbal. The gimbal may be located on a fixed platform, or found on a moving platform, such as a UAV, airplane, helicopter, or missile.

In some embodiments, digital information describing a location of an identified target flows to a tracker 60. A tracker 60 function may or may not be include in a given embodiment of the instant invention, or a tracker 60 may be included but not turned on for a particular application. The tracker 60 applies a tracking algorithm, for example, a Kalman filter. A tracker then outputs track parameters (e.g., location), and in some cases, predictions of future values of parameters in some appropriate parameter space (e.g., Cartesian coordinates for spatial tracking of objects in some position reference frames, or other parameters relevant for tracking data trends from patterns in two-dimensional data).

A variety of trackers which could be incorporated as a tracker 60 in the instant invention are available on the open market, for example, the Southern Research Institute SDD-5000.

Track parameters (e.g., target location in some reference frame) may be used, for example, to generate cross hairs to place on a display of an input scene to indicate to an operator a location of a detected object being tracked by the system. Alternatively, track parameters in an output 52 from a tracker 60 may be used to drive a gimbal to center a target in a sensor's field of view.

Hartman has discussed the use of an external tracker. This prior work did not include the tracker in the system architecture, and did not provide adaptive control of tracking functions. Initial tracking gates were set manually, and reacquisition of lost track was manual.

As indicated earlier, the instant invention provides for the use of information from a tracker 60 to support predictive selection of filters in some embodiments to improve overall performance in some applications. The sum of all this information is processed by a control computer 100 to implement a strategy for filter management and, in some embodiments, for predictively calling up the next filter.

Filters may be predictively prefetched and stored in fast, close memory 70 such as a RAM memory. Additional filters may be stored in a slower filter store 80 such as a flash memory. A very large number of filters can reside on a hard drive in an operating computer 120.

A reference filter for a correlator 40 is obtained from a temporary storage 70 of reference filters. The desired reference filter may be selected by a reference logic algorithm as shown in FIG. 7. For example, control logic may poll a sequence of reference filters while an embedded computer 100 (FIG. 1) is programmed to select the best match by determining which reference filter gives the strongest correlation peak in similarity map 41 (FIG. 2).

In a typical embodiment, virtually all functions of an embodiment of the instant invention are controlled by embedded computer 100, through one or more control busses 105, 106, 125 for example a PC-104 bus. Embedded computer 100 drives and synchronizes processes in each of one or multiple individual algorithms described elsewhere herein.

In a typical embodiment, embedded computer 100 receives set up commands from a controller 120, for example, a laptop computer, over a data link 125, which may be a TDP/IP (internet protocol) data link.

Typical embodiments of the instant invention make use of an embedded computer 100 together with a real-time operating system 110 to provide a minimum of transport delay of tracking information. Embodiments may be implemented using a more conventional frame approach, but such embodiments typically incur 180 to 240 or more milliseconds of transport delay, which delay is generally unacceptable inside a control loop for embodiments supporting real-time applications.

The instant invention encompasses an integration of multiple functions required in a practical system to solve real-world problems, including preprocessing, correlation, post processing, tracking, filter selection, feedback and/or control loops, and useful output to operator displays such as a monitor 150 or other external devices. Parameters used in various functions vary from problem to problem. In many cases, parameters in functions of the instant invention should be adaptively selected based on results from other function, and or on inputs from other sensors or data source. Therefore, our invention includes a controlling computer system.

In a typical embodiment, a computer controlled system is a Real Time Operating System (RTOS) 110, such as, but not limited to, VXWorks™.

Information from an external system or data source can be used to control functions of an embodiment of the instant invention, such as designation of objects are to be searched for, initial parameters for algorithms used in various components, and power settings. Typical embodiments of the instant invention include feedback in multiple locations so that outputs from a post-processor 50 and/or tracker 60 can be used to control and enhance future operation of an embodiment of the instant invention, e.g., to determine the next filter, to set parameters in a preprocessor 30, a correlator 40, or in a post-processor 50 or tracker 60.

As described above, selected embodiments of the instant invention may also include use of outputs from a tracker 60 or other components to control pointing systems or to control sensors or other image sources 10 in terms of gains, apertures, zooms, and other adjustable functions.

There are numerous other alternate embodiments of the instant invention. For example, all processors can be digital or analog, use FPGAs, CPUs, discrete elements, or any combination thereof.

A correlator 60 of the instant invention can be an optical correlator as taught by VanderLugt, a digital correlator that implements the correlation algorithm taught by VanderLugt, or a hybrid correlator as taught by Chatwin.

A control computer 100 of the instant invention can be special purpose or general purpose, embedded or stand alone, and fully functional and independent or slaved to other resources.

Programming of computers 100, 120 or other components of the instant invention can be in any of several languages, such as C++.

The five filter concept described earlier for some embodiments can be reduced to a smaller number. For example, a comparison of a right aspect at a smaller scale to left and right rotated aspects at a larger scale can determine all needed information for many applications in three filters.

Figure 3:
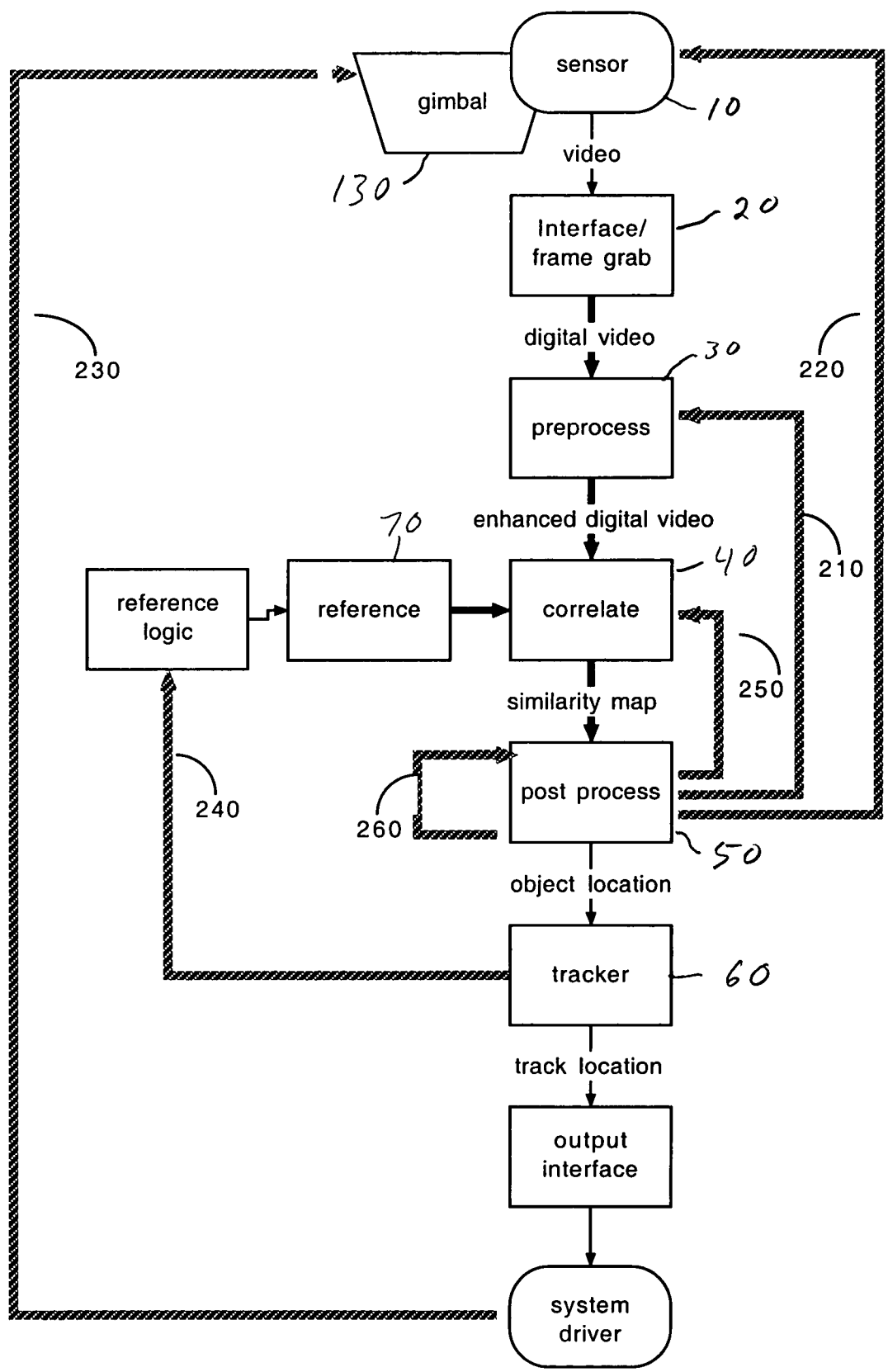
FIG. 3 is a partially schematic, partially block, diagram illustrating multiple feedback loops among components of an embodiment of the instant invention.

Unique to the instant invention are several feedback loops that provide automatic alignment and optimized performance. Representative feedback loops that may be implemented in many embodiments of the instant invention are illustrated in FIG. 3.

Loop 210 sets the parameters of the preprocessing algorithm for optimum application performance.

Loop 220 may adjust the sensor itself for optimum mission performance. One adjustment is for scale by varying zoom. Other adjustments may be for focus and iris settings.

Loop 230 uses the location output from the system driver to drive a gimbal or other pointing system, where the mission application so requires. For example, in a proportional navigation guided missile, the gimbal is aligned to point the sensor at the target, and an outer control loop of the missile itself guides the missile to intercept the target by maintaining the line-of-sight rate at zero.

Loop 240 uses results from the tracker, including possible predictive results, to help select the next reference filter.

Loop 250 provides pre-operation alignment of the correlator, to adjust the filter physical location to the optimum position.

Loop 260 may provide variable threshold settings within the post processor itself.

Of these, only loop 230 is practiced in the art.

Figure 4:
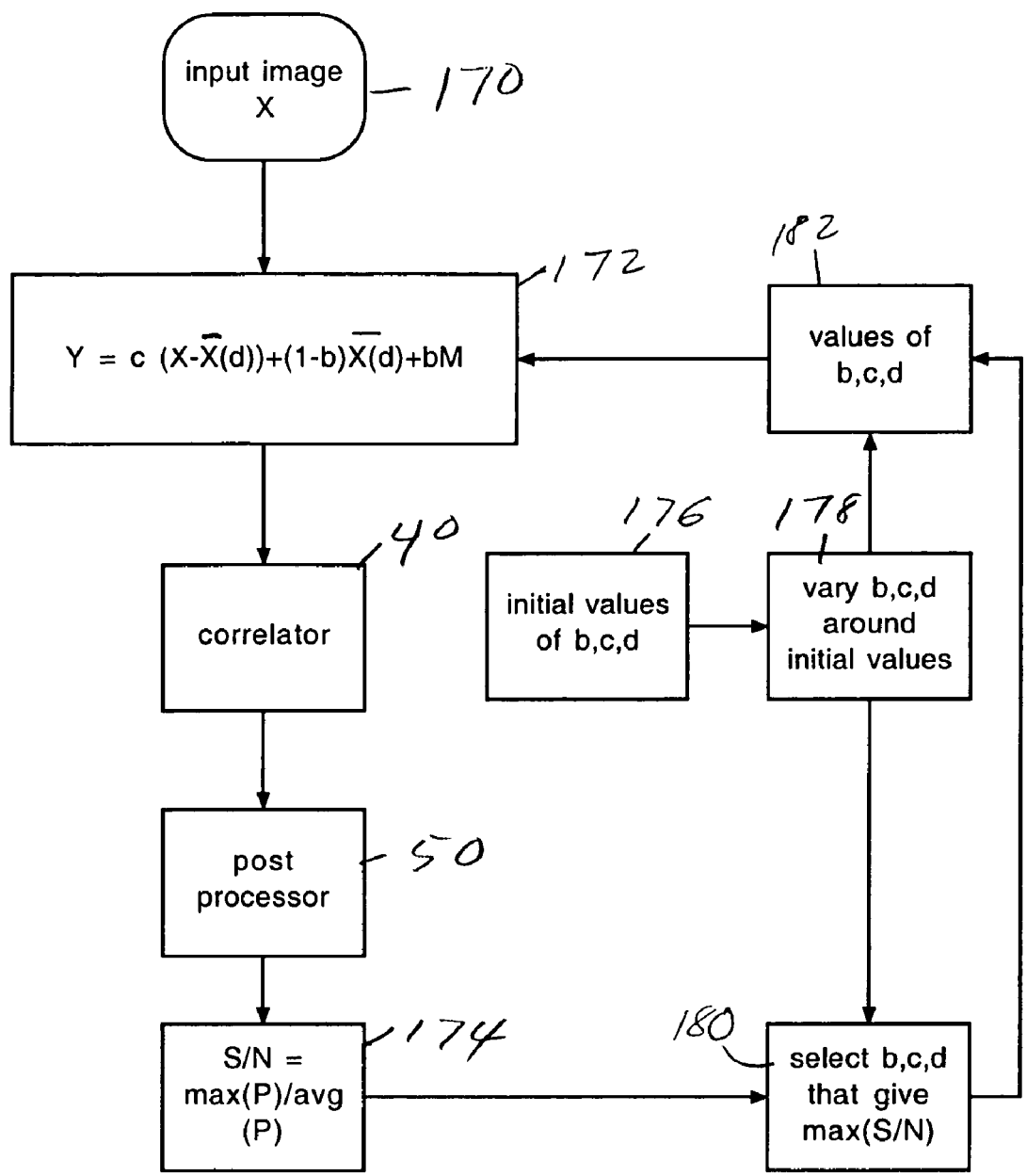
FIG. 4 is a flowchart showing an implementation in a preprocessor including an adaptive unsharp mask algorithm wherein parameters are adaptively adjusted.

The purpose of the preprocessor 30 is to provide enhancements to the image that improve the desired correlation functions. The preprocessor 30 can implement any of a variety of image enhancement algorithms. The uniqueness of the applicants' approach is that it optimizes the image for use by a correlator, rather than to make it pleasing for a human observer. For example, FIG. 4 is a flowchart of an implementation of an unsharp mask algorithm in a preprocessor 30 that could be used in some embodiments of the instant invention to initialize the system, with the parameters adaptively adjusted. FIG. 4 shows the flow of the unsharp mask algorithm as implemented in some embodiments of the instant invention. As stated, the input image is modified by the unsharp mask algorithm shown in the second box. Y is the output image. X is the input image, and $\overline{X}(d)$ is the two-dimension low pass version (the unsharped version). M is the mean brightness. B, c, and d are adjustable parameters for background, contrast, and low-pass cutoff frequency, as explained further below. Initially, at box 170 the image from camera 10 is applied to box 172, where the unsharp mask algorithm is applied. The result is provided to correlator 40 and subsequently to post-processor 50. After post-processing, the result is applied to box 174 where the signal-to-noise ratio is determined. At box 176 initial values of B, c, and d are entered as adjustable parameters for background, contrast, and low-pass cutoff frequency, respectively. These values are developed empirically, and varied slightly at box 178 about their empirically-derived values. These values are applied back to box 180, where the signal-to-noise parameter associated with the best varied initial value is set into the system. That same value is then applied to box 182 where it is applied back to the unsharp mask. This causes the unsharp mask to then provide optimized system performance.

As noted above, the preferred embodiment uses the unsharp mask, well known in the field. To understand the benefits of the unsharp mask, it is important to realize that it really sharpens an image, by subtracting the unsharp features, emphasizing the sharp ones. The unsharp mask thus emphasizes man made objects with sharp edges from natural backgrounds, resulting in increased correlation signal-to-clutter ratio. The brightness adjustment provision in FIG. 4 also increases tolerance to lighting level.

The image then flows through the correlator and post processor, as discussed elsewhere, and the signal to noise (S/N) of the peak is extracted, as the ratio of the maximum pixel brightness to the average pixel brightness. The parameters b, c and d are then varied in order to maximize the signal to noise of the correlation peak. This adaptive initialization of the parameters provides the best correlation for the mission, given the image type and the background type.

Figure 5:
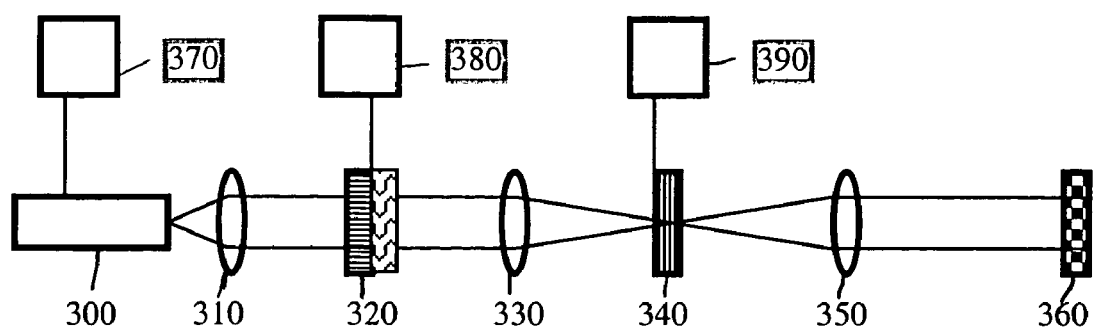
FIG. 5 is a schematic diagram illustrating use of a semi-transparent liquid crystal display device used to impose reference filters in an implementation of a VanderLudt correlator in the instant invention.

FIG. 5 illustrates a representative embodiment of an optical correlator within a correlator 40 of the instant invention. VanderLugt's original correlator used a hologram for the reference filter. The hologram provided a fully complex, in the mathematical meaning, reference filter. However, it did not provide real time operation. The correlator described herein used liquid crystal spatial light modulators both for the input image from the sensor, and the reference filter.

Laser 300 provides a source of coherent light. The laser is powered by supply 370. That light is collimated by collimating lens 310. The collimated light impinges on liquid crystal modulator 320, with attached polarizer. The input image is imposed on this modulator by input driver 380. The light, now modulated by the input image, is Fourier transformed by quadratic phase shifting lens 330. The Fourier transform of the input image impinges on liquid crystal modulator 340, which contains the reference filter provided by driver 390. The light passing though the filter is now the product of the Fourier transform of the input image, with the reference filter (which is a pre-generated complex conjugate of the Fourier transform of the reference image). This filter beam is then retransformed by Fourier transform lens 350, and impinges on detector 360, which provides the similarity map 41 (FIG. 2) output of the correlator. A reference filter of the present invention may be generated optically by imposing an image of an object of interest on liquid crystal modulator 320 (FIG. 5) and positioning detector 360 where light modulator 340 is located. The subsequent image recorded by detector 360 is then digitally recorded. In another embodiment, the complex conjugate of a Fourier transform of the reference image may be computationally obtained, as taught by VanderLugt.

Many variations of this basic design are possible. While a variety of liquid crystal modulators are available that modulate light in different ways, the preferred embodiment uses low cost projector modulators, the KOPIN (of Boston, Mass.) QVGA. These modulators rotate the polarization of the light. Modulator 320 includes a polarizer, so that the light passing through is amplitude modulated. Modulator 340 is rotated by 90 degrees, so that it can accept the polarization of light leaving modulator 320. In other variations, modulator 340 is not rotated, requiring the addition of a ½ wave plate to rotate the polarization. It is possible to reduce the spacing between lenses 310 and 330 to reduce the size of the correlator. This introduces a wave front curvature at modulator 340, requiring an addition correction lens. The Fourier lenses may be telescopic, resulting in a reduction of path length of the size of the correlator. The correlator may be folded in a variety of shapes by the introduction of folding mirrors. The instant invention can work with any of these and other variations of the correlator.

Figure 6:
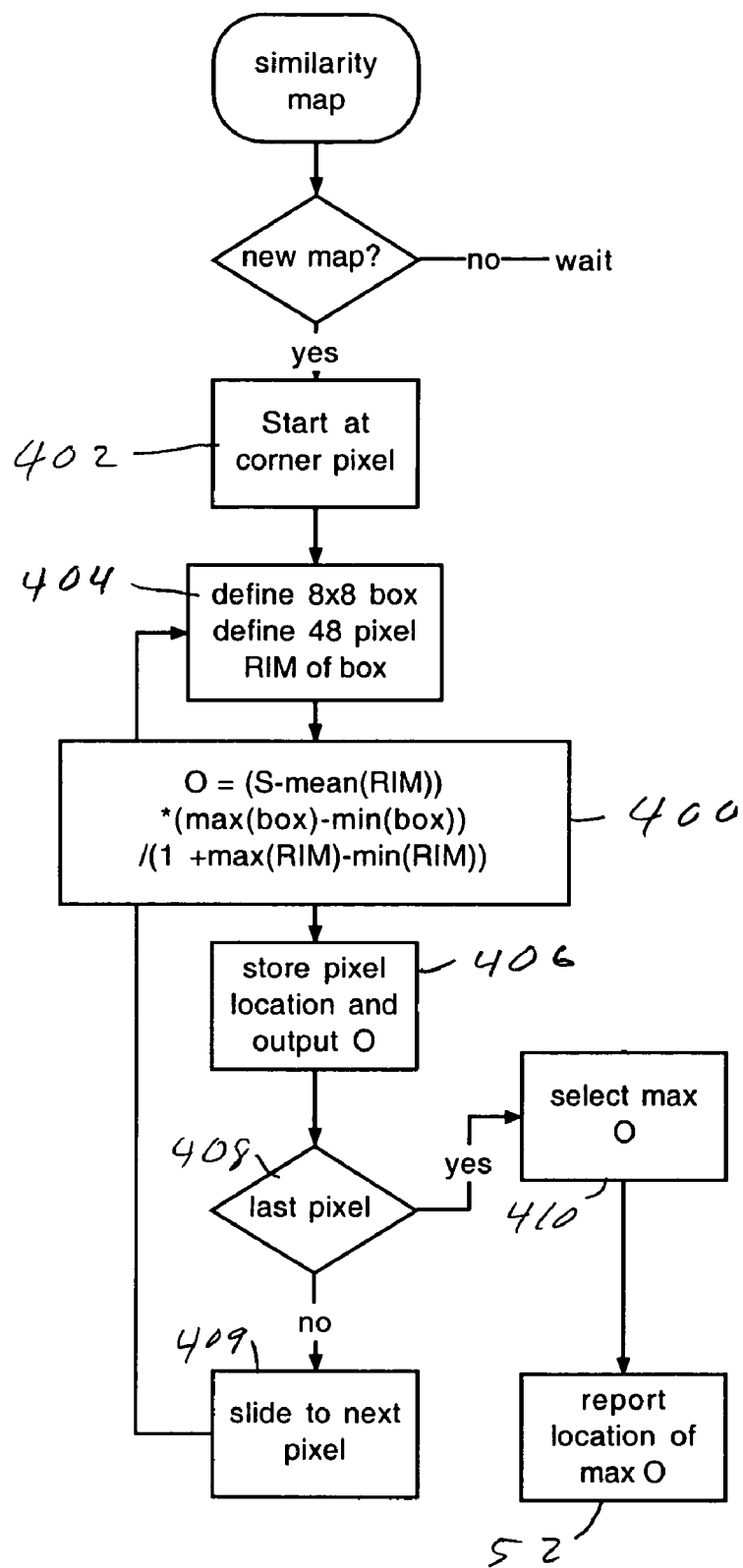
FIG. 6 is a flowchart illustrating a representative logic flow in a postprocessor in an embodiment of the instant invention.

FIG. 6 illustrates an implementation of a postprocessor that may be used in some embodiments of the instant invention. The purpose of the post processor is to locate the correlation peak. In the ideal world, with a well defined object in an uncluttered scene, this is simple. But, in the real world, clutter leaks through the correlation processor into the correlation output. There can be cross correlation between the reference image and non-target objects in the scene. So, the correlation spot is typically located in a somewhat messy field. The post processor in the preferred embodiment is similar to the Constant False Alarm Rate threshold detector in radar systems, well known to those in the field of radar. By comparing the signal at each pixel to an average of the surrounding pixels, the threshold adapts both spatially, and with time. Since the correlation focuses energy from the desired object into the correlation spot, the energy around the correlation is lowered. Thus the algorithm of the preferred embodiment invokes a "box" around the correlation peak.

FIG. 6 shows a process wherein a best correlation in the similarity map 41 is located by an iterative process wherein, for example, an 8×8 box of pixels is sequentially formed around each pixel beginning at one corner of the similarity map 41. In each pixel box, the formula of box 400 normalizes the signal in a similar manner as a constant false alarm thresholding algorithm as is commonly used to set detection thresholds in radar. At box 402 a corner pixel is selected and the 8×8 box is formed, with pixels located outside the array filled with zeros (0's), as shown at box 404. The algorithm at box 400 is then performed, and the result applied to box 406, where the value resulting from box 404 is stored and indexed to the location for that pixel. At box 408, the question is asked as to whether the last-tested pixel is the last pixel, and if not then the program loops at box 409 back to box 404 to iterate or slide the box to the next pixel, where the calculation of box 400 is repeated. If the answer at box 408 is yes, then the highest indexed value is retrieved, and reported as object location 52 of FIG. 2.

More specifically, the indexing may be accomplished as follows. The output value of Pixel I,J is given by Oij, which is related to the original signal Sij of that pixel. Each value of Oij is put into an output matrix, and after the entire correlation plane has been processed, the values of the output and its location, for the maximum output, are reported to the rest of the system.

The advantages of this algorithm are that the thresholding adapts spatially to different levels of illumination in the input image, or uneven intensity distributions within the correlator.

As stated, the RIM and BOX are filled with zeros when the subject pixel is within 3 or 4 pixels of the edge of the image. The only adjustable parameter in this algorithm as shown is the size of the box. This could be an adaptive parameter based on varying the parameter and examining the false alarm and detection rates. The adjustment, known to those familiar with the field of radar, results in a Receiver Operating Curve (ROC curve). In our experience, the image correlator is not very sensitive to this parameter. Also possible, but not shown in the flow chart, is an adjustment to allow multiple correlation peaks to be measured, in the case of multiple desired objects in the field of view.

FIG. 7 shows an implementation of tracker feedback used to support selection of reference filters to enhance performance. This is accomplished by initially obtaining a new image from camera 10, as, for example, every 15 milliseconds, at box 500. At box 502 the image is correlated with a filter selected based on the exogenous data obtained as described for FIG. 1 and the correlation is stored at box 504. A filter with a slightly different range is selected for a second correlation which is also stored at box 506. At box 508 another filter is selected wherein the aspect angle is slightly altered, and this filter is correlated and the result stored at box 510. The equations at box 512 are applied at all three (3) stored values to obtain the actual range and aspect at the time the original image was taken. At box 514 a Kalman filter predictively calculates the range and aspect at the time of the next image field. This process loops endlessly as long as the program is running. Significantly, the location of the target is provided at box 516 after only 5 milliseconds for tracking, or other purposes, while the program continues so that the next best filter may be predictively retrieved. Typically, in an interceptor guidance mode, the transport delay needs to be less than 10 milliseconds for effective guidance. As such, applicants provide a guidance system wherein the transport delay is reduced to 5 milliseconds or so at box 516 while, as stated, the other calculations for predictive retrieval of a filter are performed.

Figure 8:
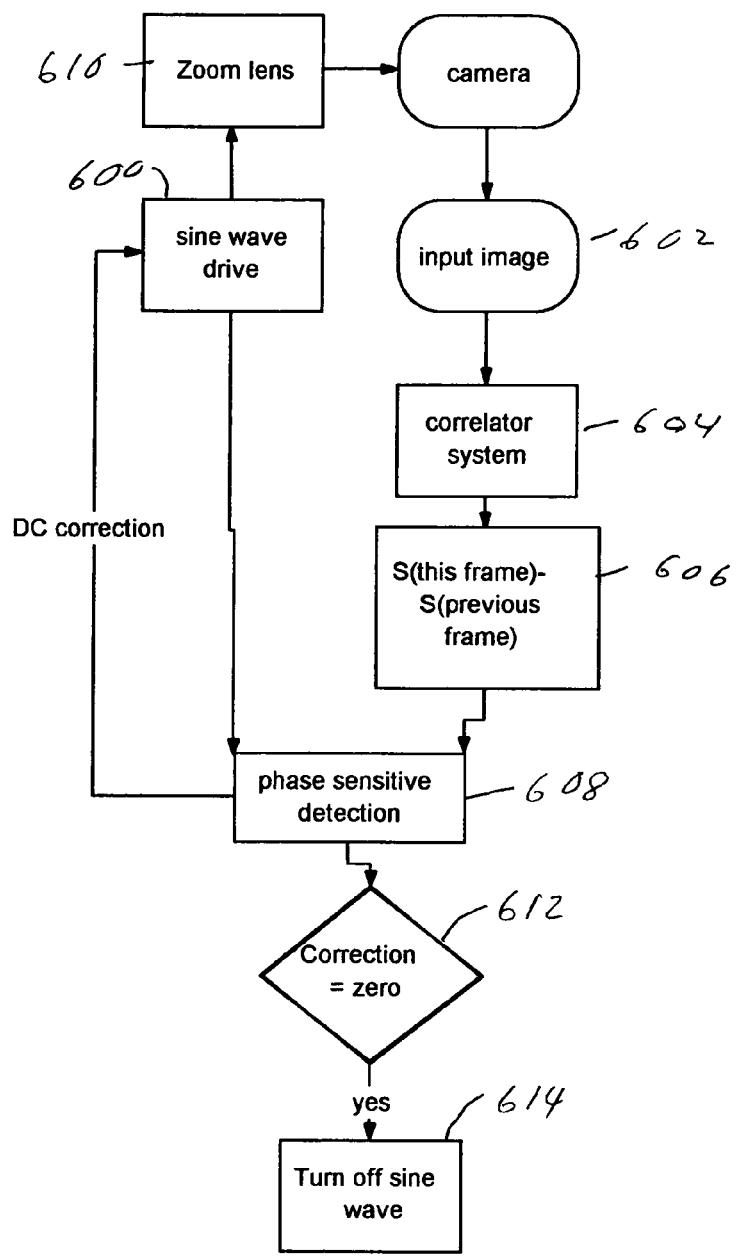
FIG. 8 is a flowchart illustrating a representative implementation of a feedback loop which may be used with a zoom lens to control scale of objects in an embodiment of the instant invention.

FIG. 8 shows a typical example of how one of the many feedback loops available by use of the complete system may be used to control parameters of the camera or lens, or any other similar parameter.

In cases with a fixed range from the sensor to the object, the scale can be fine tuned by use of a zoom lens in the sensor. This has been done in the past by an operator adjusting the zoom lens while observing the image against a scale. In this invention, as an example, the system may automatically adjust the zoom lens.

The zoom ratio is varied in a sine wave manner at box 600, somewhat slow compared to the field rate of the sensor. The correlation signals developed at boxes 602, 604, and 606 as described earlier are fed to a phase sensitive detector at box 608 configured as a "lock-in amplifier," as is well known to persons in the signal processing, field. The lock-in amplifier outputs a DC signal back to box 600 proportional to the scale error. The signal drives the zoom motor at box 610. When the motor drives the zoom to the correct scale, the output of the phase sensitive detector approaches zero at box 612, at which point the drive is turned OFF at box 614. This process sets the system range to the target, which in turn sets the scale for filter selection. To initiate this process of FIG. 8, the sine wave drive to the lens is simply activated, and the process of FIG. 8 is applied, and then automatically terminates when the system is set.

Having thus disclosed my/our invention and the manner of its use, it should be apparent that incidental changes may be made thereto that fairly fall within the scope of the following appended claims, wherein we claim:

1. A method using an optical correlator, a preprocessor and a postprocessor for performing near real-time correlations between images of a sequence of images possibly containing an object of interest and electronically stored reference filters selected from a plurality of electronically stored reference filters each containing an optically modified reference view of an object of interest comprising:
    A) storing said plurality of reference filters in a first electronic library,
    B) electronically capturing an image of said sequence of images as an electronic representation,
    C) selecting one or more of said reference filters likely to provide at least one correlation peak with said possible said object of interest in an electronically captured said image of said sequence of images,
    D) using said optical correlator, rapidly comparing, in near real-time, each of said selected reference filters to said electronically captured image of said sequence of images,
    E) using said post processor to identify those said selected reference filters having a highest correlation peak with said electronically captured image, and,
    F) developing at least one feedback signal from step E) for predictably controlling and optimizing further selection of said reference filters and said preprocessor performing preconditioning of following electronically captured images of said sequence of images.

2. The method as set forth in claim 1 further comprising:
    selecting, through use of at least one predictive algorithm, a small plurality of said reference filters likely to develop correlation peaks with an object of interest in said following electronically captured images,
    storing said small plurality of said reference filters in a second, fast temporary electronic library for fast retrieval.

3. The method as set forth in claim 2 wherein said F) further comprises varying gamma, gain and offset of a said electronically captured image to optimize said correlation peaks.

4. The method as set forth in claim 3 wherein said F) further comprises applying a local region algorithm to optical components of said electronically captured image to optimize said correlation peaks.

5. The method as set forth in claim 1 wherein said C) further comprises selecting one or more reference filters based on exogenous data with respect to a possible object of interest in at least a first electronically captured image of said sequence of images.

6. The method of set forth in claim 5 further comprising selecting following said reference filters for correlation with following said electronically captured images based on a located correlation peak between said object of interest in said one or more reference filters based on said exogenous data and said object of interest in said at least a first electronically captured image.

7. The method as set forth in claim 6 further comprising:
    H) determining a trend from said correlation peaks in said following electronically captured images, and,
    I) predictably selecting said following reference filters based on said trend, and storing said following reference filters in a second temporary, fast memory for fast retrieval and correlation with a next said electronically captured image of said sequence of images, and,
    J) repeating said H) and I) in order to track said object of interest in said sequence of images.

8. The method as set forth in claim 7 further comprising calculating location of said object of interest in a said electronically captured image within about five milliseconds or so.

9. The method as set forth in claim 1 further comprising generating said reference filters by:
    K) directing a collimated beam of light through an image of a said object of interest applied to a liquid crystal spatial light modulator,
    L) developing a complex conjugate of a Fourier transform of said image of said object of interest to generate a reference filter of said reference filters,
    M) developing a complex conjugate of said reference filter,
    N) performing an autocorrelation between said reference filter and said complex conjugate of said reference filter,
    O) varying an intensity level of said collimated beam of light to obtain a highest correlation peak,
    P) associating a selected said intensity level of said collimated beam of light that obtains a highest said correlation peak with a respective said reference filter.

10. The method as set forth in claim 9 wherein said D) further comprises:
    Q) adjusting an intensity level of a collimated, coherent beam of light directed through said electronically captured image to said selected intensity level of a said selected reference filter to obtain a spatially modulated image with a light intensity level generally that of said selected intensity level,
    R) performing a Fourier transform of said spatially modulated image to obtain a Fourier transformed, spatially modulated image,
    S) passing said Fourier transformed, spatially modulated image through a said selected reference filter to obtain a combined image,
    T) performing a Fourier transform on said combined image to obtain a similarity map indicating degree of correlation between said electronically captured image and said selected reference filter and where correlation with said object of interest is located in said current image.

11. A system employing an optical correlator for identifying and reporting selected patterns in at least some images from an image source and comprising:
    a plurality of optical reference filters each including a complex conjugate of a Fourier transform of a reference filter of a pattern being sought, a preprocessor receiving said images and selectively enhancing said images by varying gamma, gain and offset to optimize correlation peaks, said optical correlator receiving enhanced said at least some images and at least one optical reference filter of said plurality of said optical reference filters wherein a single image of said at least some images at a time is compared to said at least one optical reference filter to produce a similarly map, a post-processor receiving said similarly map and indicating at least one of a strength and corresponding location of any existing said correlation peaks, and, at least one feedback loop for predictively selecting said reference filter based on selected features of said similarity map.

12. The system of claim 11 wherein said optical correlator comprises:

a source of coherent light, a collimating lens receiving said coherent light, a first liquid crystal light modulator upon which said input image is impressed, and receiving collimated said coherent light so that said collimated light is modulated by said input image, a first Fourier transform lens receiving said collimated, coherent light modulated by said input image, a second liquid crystal light modulator receiving Fourier transformed said collimated, coherent light modulated by said input image and upon which said optical reference filter is impressed for producing a product of a Fourier transform of said input image and said reference filter, a second Fourier transform lens receiving said product and re-transforming said product, a multi-pixel detector array upon which a retransformed said product falls and is detected as a similarly map.

13. The system of claim 11 further comprising an adoptive, spatially-variant, constant false alarm rate threshold algorithm in said post processor, and a feedback loop for adjusting said false alarm rate threshold.

14. The system of claim 12 wherein an intensity of said coherent light source is adjustable to a light intensity level of a selected said reference filter, obtaining a spatially modulated image with a light intensity level generally that a selected light intensity level of said reference filter.

15. A system employing an optical correlator for identifying, tracking, and reporting patterns in a stream of input images from an input source, said system comprising:

a reference filter store including a plurality of reference filters, each reference filter comprising a complex conjugate of a unique view of an object of interest, at least some of said reference filters comprising an indication of a light intensity level of a coherent light source used to create each of said at least some of said reference filters wherein said light intensity level is a said light intensity level obtaining a highest correlation peak in an autocorrelation process used to create a respective said reference filter, a preprocessor receiving said stream of input images and enhancing for correlation at least some of said input images, an optical correlator receiving an enhanced input image and one or more selected reference filters to produce a similarity map based on an optical comparison between said enhanced input image and said selected reference filter, and further wherein a light intensity level of a coherent light source used in said correlation process to illuminate said input image is adjusted to said indication of a light intensity level of a selected said reference filter being compared with said input image, a post-processor receiving said similarly map and producing correlation outputs that indicate strength and location of at least one located correlation peak in said similarly map, said post-processor further applying predicted filtering in conjunction with said correlation outputs to track at least one parameter of said object of interest, said parameter including at least one location, aspect, and scale of said object of interest, and a feedback loop that enables selection of said one or more reference filters from said filter store responsive to said post-processor.

16. The system of claim 15 wherein said optical correlator comprises:

said source of coherent light used in said correlation process, a collimating lens for collimating said coherent light, a first liquid crystal light modulator receiving collimated said source of coherent light used in said correlation process and whereupon said enhanced input image is impressed so that said collimated coherent light is modulated by said enhanced input image, a first Fourier transform lens receiving said collimated coherent light modulated by said input image and providing a first Fourier transform of said collimated coherent light modulated by said input image, a second liquid crystal light modulator receiving said first Fourier transform and upon which is impressed a said reference filter selected by said predictive filter, so that said first Fourier transform is further modulated to become a product of said first Fourier transform and said selected reference filter, a second Fourier transform lens receiving said product and providing a second Fourier transform, a multi-pixel optical detector upon which said second Fourier transform impinges and develops said similarly map as an output.

17. The system of claim 15 further comprising a system-driver-to-reference-logic loop that uses said location of a said located correlation peak from said post processor to drive a pointing system associated with said input source in order to track said object of interest.

* * * * *